United States Patent [19]
Maricocchi

[11] Patent Number: 5,254,413
[45] Date of Patent: Oct. 19, 1993

[54] METHOD FOR REPAIR AND RESTORATION OF A CERAMIC THERMAL BARRIER-COATED SUBSTRATE BY PROVIDING AN INTERMETALLIC COATING

[75] Inventor: Antonio F. Maricocchi, Loveland, Ohio

[73] Assignee: General Electric Company, Cincinnati, Ohio

[21] Appl. No.: 870,176

[22] Filed: Apr. 16, 1992

Related U.S. Application Data

[63] Continuation of Ser. No. 648,770, Jan. 3, 1991, abandoned.

[51] Int. Cl.$^5$ .................. B32B 15/00; B32B 35/00
[52] U.S. Cl. ......................... 428/633; 428/632; 428/650; 428/652; 428/621; 427/140; 427/142; 427/250; 427/252
[58] Field of Search ............. 427/250, 252, 140, 142, 427/456, 455; 428/650, 652, 653, 621, 629, 632, 633

[56] References Cited

U.S. PATENT DOCUMENTS

| | | | |
|---|---|---|---|
| 3,625,750 | 12/1971 | Baranow | 427/252 |
| 3,904,789 | 9/1975 | Spiers et al. | 427/252 |
| 4,004,047 | 1/1977 | Grisik | 427/252 |
| 4,399,199 | 8/1963 | McGill et al. | 428/633 |
| 4,464,430 | 8/1984 | Baldi | 427/252 |
| 4,965,095 | 10/1990 | Baldi | 427/252 |
| 4,978,558 | 12/1990 | Lamm | 427/250 |

Primary Examiner—Roy King
Attorney, Agent, or Firm—Jerome C. Squillaro; Carmen Santa Maria

[57] ABSTRACT

An aluminide coating is applied to a portion of the surface of an article that already has a thermal barrier coating system in place over another portion of its surface. The portion of the surface to be coated is contacted, at elevated temperature, with an aluminide coating source material that is a mixture of from about 18 to about 45 weight percent of a metallic source of aluminum and the balance ceramic particles. The metallic source of aluminum may be pure aluminum or an aluminum-containing alloy. No halide activator is present in the aluminide coating source material.

19 Claims, 2 Drawing Sheets

METHOD FOR REPAIR AND RESTORATION OF A CERAMIC THERMAL BARRIER-COATED SUBSTRATE BY PROVIDING AN INTERMETALLIC COATING

This application is a continuation of application Ser No. 07/648,770, filed Jan. 31, 1991, now abandoned.

BACKGROUND OF THE INVENTION

This invention relates to nickel-based and cobalt-based superalloys, and, more particularly, to coatings that are applied to such superalloys to protect them from oxidation and corrosion damage.

Aircraft gas turbine (jet) engines operate by drawing air into the front end of the engine, compressing it, mixing the compressed air with fuel, and igniting the mixture in a combustor to form a hot exhaust gas. The exhaust gas passes through a turbine which drives the air compressor, and exits the back end of the engine to generate thrust that drives the engine and aircraft forward. Those portions of the engine contacted by the hot exhaust gas are repeatedly cycled to both high temperatures and high stresses during service of the engine.

There is a continuing effort to achieve ever-higher operating temperatures in the combustor, turbine, and exhaust sections of the engine, because higher operating temperatures lead to increased engine efficiency. At the present time, operating temperatures can exceed 2000° F. One primary approach to the attaining of increased operating temperatures has been the introduction and refinement of nickel-based and cobalt-based alloys, termed "superalloys" in the art, that are strong at high operating temperatures and resist progressive deformation called creep and cyclic deformation called fatigue during extended service.

Although the superalloys exhibit excellent mechanical properties at elevated temperatures, they are subject to severe degradation by oxidation and hot corrosion during service. The hot exhaust gases, which may include large amounts of salts as well as combustion products, are particularly damaging to the metal alloys, and can quickly corrode and erode the metal away. Many parts of the hot sections of the engine require the maintaining of tight tolerances in order to be effective, and loss of substantial amounts of metal by hot gas corrosion and erosion leads to reduction of engine performance.

Since hot corrosion and erosion occur primarily at surfaces exposed to the hot combustion gas, a number of different types of surface treatments have been developed to resist the surface damage. In one approach, a coating is applied to the surface. The coating material is selected to be resistant to hot oxidation, corrosion, and erosion. It also must be selected and applied in such a way as to resist cracking and flaking away (termed "spalling") during repeated thermal cycles from ambient temperature to the operating temperature.

One class of protective coating, termed a "thermal barrier coating" or "TBC" system in the art, is formed of one, two or more layers, one on top of the other in the multilayer cases. In one TBC system having two layers, the bottom layer or bond coat adjacent the superalloy substrate to be protected is an MCrAlY alloy. The top layer or top coat is a ceramic, typically formed of modified zirconium oxide that resists erosion damage and also insulates the superalloy substrate.

A number of techniques for applying the thermal barrier coating system to an article are known in the art. In one such approach presented as an example, the bond coat is applied by a pack cementation process in which the surface of the article is contacted at elevated temperature to a mixture of inert particles, a small amount of an aluminum-containing alloy, and a halide activator material. The bond coat is formed by interdiffusion of the aluminum from the aluminum-containing alloy and the nickel in the article, after which the upper surface of the bond coat is oxidized. Plasma spray processes are also sometimes used to deposit the bond coat. The ceramic top coat layer is applied by physical vapor deposition or other ceramic deposition technique such as plasma spray deposition.

Thermal barrier coating systems work well, and achieve good performance in a variety of hot section applications.

A problem arises, however, because once the thermal barrier coating system is in place on the surface of an article, it is difficult to coat other portions of the surface with an aluminide. Such a situation arises in various contexts. Thus, for example, if an article is first coated with the thermal barrier coating and there arises a need to drill a hole in the article or machine away a small region of the surface, the result is an exposed portion that has no coating protection. In another example, if an article having a thermal barrier coating system in place is joined to another article, the region near the joint has no protective coating. Finally, in a common situation the thermal barrier coating may be damaged during use, and a repair is necessary to a relatively small area of the article.

If the conventional pack cementation approach to applying the bond coat is used on an article that already has a thermal barrier coating system in place over another portion of the surface, the existing TBC material is observed to crack so that little or no service life remains in the thermal barrier coating. If that portion is repaired, then other regions of the TBC coating similarly fail.

There is a need for an approach for applying an aluminide coating layer to an article which has an existing TBC system in place over some other portion of the surface of the article. The approach must be compatible with existing manufacturing and/or repair techniques and must produce an acceptable nickel or cobalt aluminide coating on the surface of the article. The present invention fulfills this need, and further provides related advantages.

SUMMARY OF THE INVENTION

The present invention provides a process for applying an aluminide coating to an unprotected portion of the surface of an article that already has a ceramic protective coating, such as a thermal barrier coating, present over some other protected portion. The aluminide coating is applied without damaging the ceramic coating that is already in place on the protected portion of the surface. The process is fully compatible with existing manufacturing and/or repair procedures.

In accordance with the invention, a process for providing an aluminide coating on the surface of an article comprises providing an article having a thermal barrier coating over a portion of the surface of the article; and contacting at least the uncoated portion of the surface of the article with an aluminide coating source material, the aluminide coating source material comprising a mixture of from about 18 to about 45 percent by weight of a metallic source of aluminum and the balance ceramic particles, the aluminide coating source material having substantially no halide activator therein.

In practicing the approach of the invention, the article already having a thermal barrier coating in place over the coated portion of the surface is contacted with the aluminide coating source material, at least in the uncoated portion to be coated, at a sufficiently high temperature that interdiffusion occurs between free aluminum from the source material and the surface to be protected. The aluminide coating source material is a mixture of ceramic particles, preferably aluminum oxide, and a metallic source of aluminum. The metallic source of aluminum is present in the aluminide coating source material in an amount of from about 18 to about 45 weight percent of the total mixture. There is no halide activator present.

The present approach differs from established pack cementation practice for applying a nickel aluminide coating to a completely uncoated surface in two important respects. First, in the present approach the metallic source of aluminum is present in an amount of about 18-45 percent of the total, and preferably about 20-40 percent, while in the conventional approach for depositing a coating by pack cementation on a nickel substrate the metallic source of aluminum is present in an amount of only about 1-5 percent of the total. Second, in the present approach there is no halide present to act as an activator for the process, while on the order of 0.1 percent of a halide such as ammonium fluoride is present in the conventional approach. It is found that if the conventional approach is used to apply a nickel aluminide coating to the surface of an article that already has a TBC system in place, the procedure is unsuccessful because a portion of the existing TBC system spalls away while the new coating is in progress. The present approach, on the other hand, is fully successful in applying a nickel aluminide coating to an article that already has a TBC system in place.

Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

Figure 1:
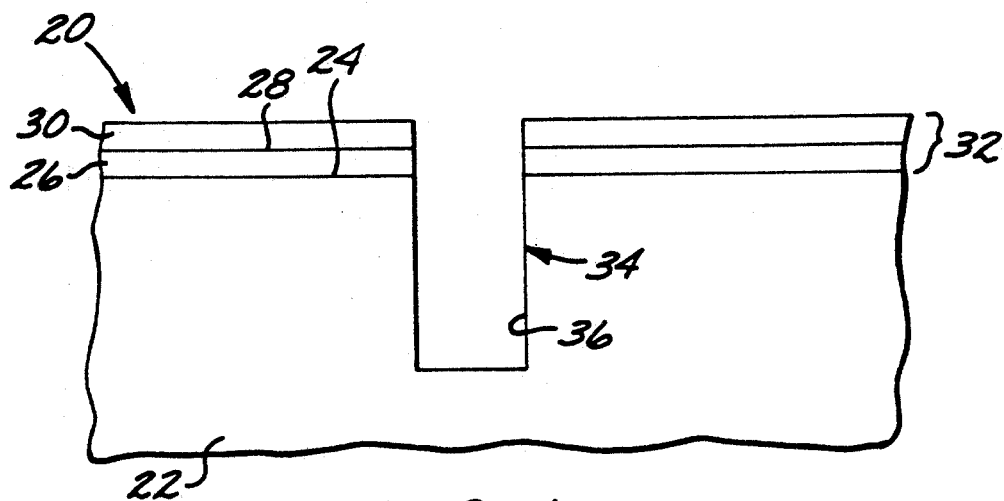
FIG. 1 is a side elevational view of an article with a thermal barrier coating system in place over a portion of its surface.

In accordance with the invention, a process for providing an aluminide coating on the surface of an article comprises providing an article having a thermal barrier coating system overlying at least a portion of the surface of the article; subjecting the article to conditions such that, after the step of subjecting, an uncoated portion of the surface of the article has no thermal barrier coating system thereupon; and coating at least the uncoated portion of the surface of the article with an aluminum-containing coating by contacting the uncoated portion with an aluminide coating source material at elevated temperature so that the uncoated portion of the surface is aluminided by diffusion, without damaging the thermal barrier coating on the remainder of the article.

The need for the use of the approach of the invention usually arises when an article 20, that is protected by a thermal barrier coating system, is subjected to some condition or processing that removes a part of the thermal barrier coating system. The newly exposed surface must then be re-protected or it may serve as the initiation site for premature failure during service. The existing structure of the article 20 will be described with reference to FIG. 1 as an aid in understanding the area of applicability of the present invention.

The article 20 initially includes a substrate 22 with a coated surface 24. The article 20 may be a nickel-based or a cobalt-based superalloy that has a substantial nickel content. An example nickel-based superalloy with which the present invention has been used is Hastelloy X, which has a composition in weight percent of 0.05-0.10 percent carbon, 1.0 percent maximum manganese, 1.0 percent maximum silicon, 0.04 percent maximum phosphorus, 0.03 percent maximum sulfur, 20.5-23.0 percent chromium, 0.5-2.5 percent cobalt, 8.0-10.0 percent molybdenum, 0.20-1.0 percent tungsten, 17.0-20.0 percent iron, 0.008 percent maximum boron, remainder nickel. The coated surface 24 has an overlying bond coat 26. The bond coat 26 is preferably an MCrAlY alloy or a nickel aluminide intermetallic compound of the form NiAl, but may be alloyed with modifiers such as platinum or rhodium which are known to aid environmental resistance. A top surface 28 of the bond coat 26 is normally oxidized to form a thin aluminum oxide layer that is not depicted as a separate layer in FIG. 1. It will be understood that there can be a diffusional gradient between the bond coat 26 and the substrate 22, even though there is shown a sharp line between the two for illustrative purposes.

Overlying the bond coat 26 is a top coat 30. The top coat 30 is preferably zirconium oxide with from about 6 to about 20 weight percent yttrium oxide therein. The top coat may also be modified with other alloying elements, and may be deposited so as to have a particular grain structure. Deposition of the top coat 30 is normally by physical vapor deposition or other process capable of depositing ceramics such as plasma spraying. The bond coat 26 and the top coat 30 together constitute the thermal barrier coating system 32.

The article 20 with the thermal barrier coating system 32 in place on its surface 24 may be subjected to any of several types of conditions wherein the thermal barrier coating system 32 is disrupted. In the illustration of FIG. 1, a hole 34 has been drilled into the article 20. This hole might have a flat bottom, as illustrated, or might connect with sub-surface cooling passages in a typical turbine blade application. The hole has sides 36, which after drilling are uncoated and therefore unprotected from environmental damage such as oxidation and hot corrosion in the hot combustion gas stream.

Uncoated regions in the previously coated article 20 can be formed in many other ways. One is intentional machining of the surface of the article. Another is a joining process wherein the joined region has no ceramic coating or TBC. Another is service damage such as foreign impact damage due to impact, for example, a stone bruise caused when a small stone is ingested into the engine during service. Many other situations that disrupt the thermal barrier coating system 32 can be imagined. The present invention will be discussed in relation to the bored hole example of FIG. 1, but its principles are equally applicable to the other situations.

To coat the sides 36 of the hole, an aluminide coating source material is first prepared. The aluminide coating source material is preferably a mixture of two components. One is a ceramic, preferably aluminum oxide. The ceramic is preferably furnished as particles having a size of less than about 44 micrometers (i.e., passing through a −325 mesh screen). The other component is a metallic source of aluminum, preferably aluminum powder. The metallic source of aluminum may be other types of metallic powders, such as an alloy of 50–70 weight percent titanium, 20–48 weight percent aluminum, and 0.5–9 weight percent carbon, or any other metallic carbide alloy. The metallic source of aluminum is preferably furnished as a mixture made up primarily of particles having sizes that range from 45–150 micrometers, but smaller and larger sizes are also permitted. The metallic source of aluminum is present in an amount of from about 20 to about 40, preferably 30 weight percent of the aluminide coating source material, with the balance being the ceramic powder, preferably aluminum oxide. The ceramic and metallic source of aluminum can also be furnished in the form of a tape carrying the components or a liquid suspension of the components, or any other useful form.

There is no halide activator present or used in the aluminide coating process. Halide activators such as aluminum chloride or ammonium fluoride have been commonly used in pack cementation processes for forming aluminide layers in the past, but it has been discovered that their presence during the aluminizing operation of the present invention is deleterious.

The aluminide coating source material is contacted to the uncoated surface 36 of the article 20. In the approach shown in FIG. 2, the entire article 20 is packed in the mixture of ceramic and aluminum source powders, as indicated at numeral 37. If more convenient, the mixture of powders can be applied just to the region to be coated.

Figure 2:
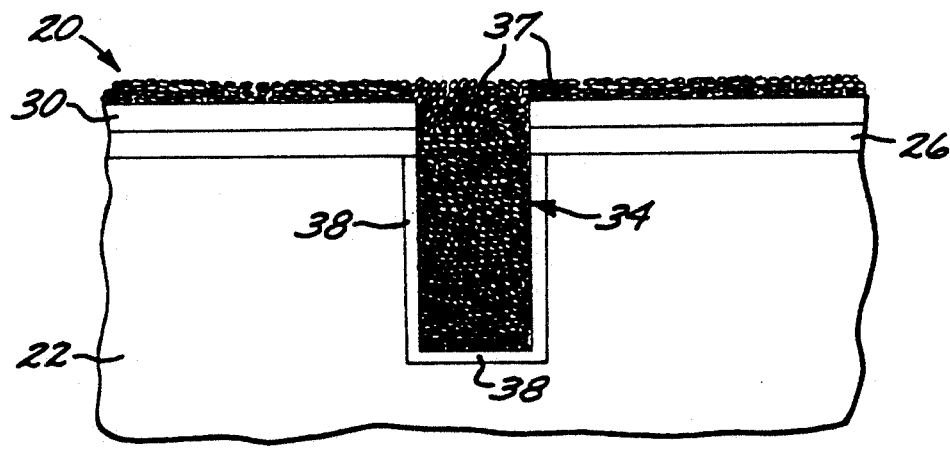
FIG. 2 is a side elevational view of the same region shown in FIG. 1, during pack cementation of the uncoated portion.

After the aluminide coating source material is contacted to the uncoated surface, the article 20 and powder mixture are heated to a temperature sufficiently high that there is an interdiffusion between the source of aluminum and the substrate 22 at its surface. An example of a diffusion temperature is 1975° F. The operation is preferably conducted in an inert atmosphere such as argon, but also may be conducted in a reducing atmosphere such as hydrogen. At this temperature, aluminum deposits onto the substrate 22, and nickel diffuses outwardly, forming a layer of a nickel-containing aluminide that may be modified by other alloying elements present in the aluminum source material or the substrate. A protective layer 38 is thereby formed at the previously unprotected surface 34. FIG. 2 illustrates the protective layer during formation before it reaches its full thickness. The protective layer 38 is desirably on the order of 0.0015 to 0.0025 inches thick at the completion of the processing. A diffusion treatment of 1975° F. for 4 hours is preferred to attain that thickness.

Figure 3:
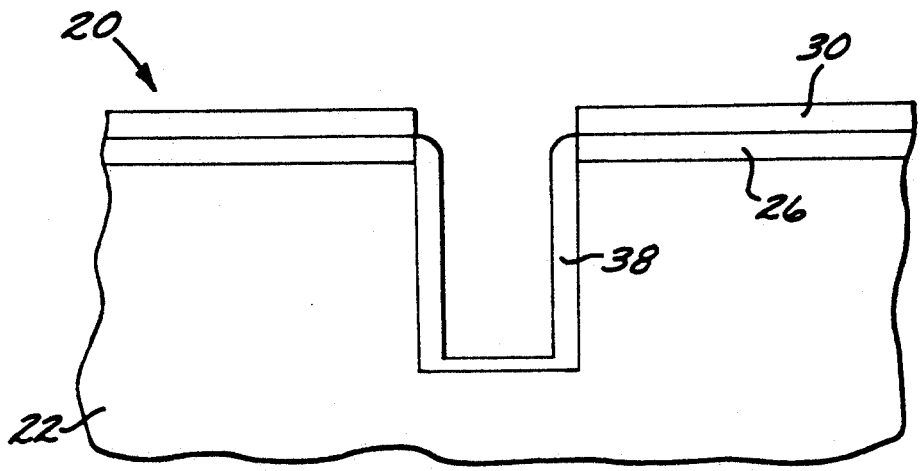
FIG. 3 is a side elevational view of the same region shown in FIG. 2, after the process is complete.

FIG. 3 illustrates the article 20 after the aluminide coating source material has been removed. The article 20 retains the thermal barrier coating system 32 on its surface 24, which was present prior to the processing of the invention. The existing coating system 32 is undamaged and unaffected by the treatment. Additionally, it has the protective aluminide layer 38 on the previously unprotected sides 36 and bottom of the hole 34. Tests have shown that a satisfactory protective layer 38 may be formed to the bottom of holes having a length of up to fifteen times that of the diameter. A similar newly formed protective layer 38 is present on any and all other previously unprotected surfaces that were contacted by the aluminide coating source material and treated as described previously. In some instances, it may be desirable to apply a top coat over the protective layer 38, but that would not normally be done in the interior of holes.

Figure 4:
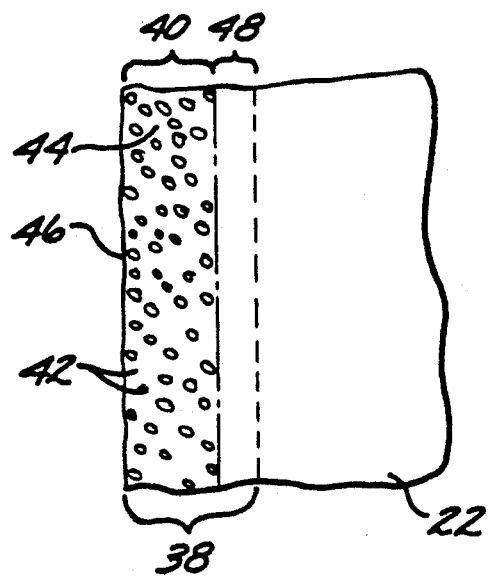
FIG. 4 is an enlargement of the newly coated region of FIG. 3.

FIG. 4 illustrates the structure of the protective layer 38 on substrate 22 in greater detail. When the substrate 22 is a nickel-based superalloy, the protective layer 38 may include an outer layer 40 of ceramic (aluminum oxide) particles 42 embedded in interdiffused layer 44 of aluminum, nickel, and other elements that may be present. When the substrate 22 is a cobalt-based superalloy, the protective layer 38 may include an outer layer 40 of ceramic (aluminum oxide) particles 42 embedded in interdiffused layer 44 of aluminum, cobalt, and other elements that may be present. (The particles 42 are present in the pack mixture, and remain in the interdiffused region of the protective layer 38.) An outer surface 46 of the layer 44 is normally oxidized to form an aluminum oxide layer. The outer surface 46 of the layer 44 is normally moderately rough, because of the presence of the particles 42 at the surface. When the substrate is a nickel-based superalloy, an inner layer 48 is interdiffused aluminum, nickel, and other elements that may be present, and when the substrate is a cobalt-based superalloy, an inner layer 48 is interdiffused aluminum, cobalt, and other elements that may be present. The layer 44 and inner layer 48 together include a region of aluminide that is instrumental in forming the aluminum oxide surface layer and the diffusion barrier to inward diffusion of elements from the combustion gas into the substrate 22.

It has been known in the past to utilize pack cementation techniques to apply a bond coat or nickel aluminide layer to the surface of an article. These techniques are disclosed, for example, in U.S. Pat. Nos. 3,415,672; 3,540,878; 3,598,638; 3,617,630; and 3,718,962, whose disclosures are incorporated by reference. In these techniques, a mixture of an aluminum-containing metallic alloy, aluminum oxide powder, and a halide activator is contacted at elevated temperature to the surface of the article to be treated, resulting in an interdiffusion of the aluminum-containing alloy and the surface of the article. The result is a nickel aluminide surface coating.

Figure 5:
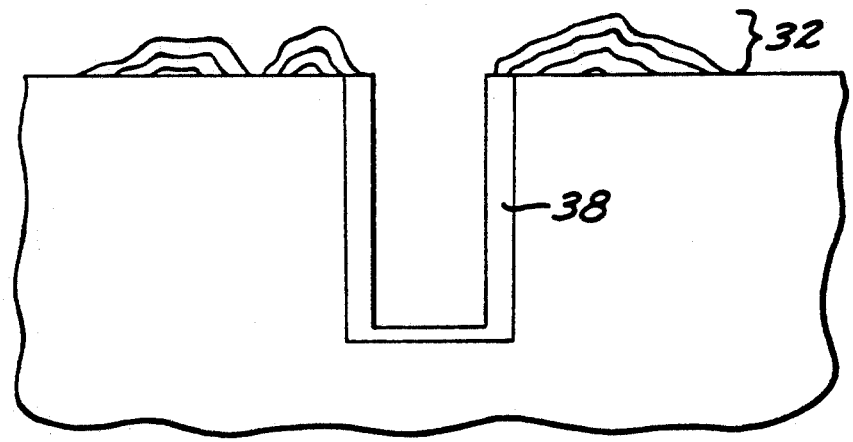
FIG. 5 is a side elevational view of a region like that of FIG. 1, except after pack cementation by a conventional procedure.

When such an approach is used in an attempt to provide a protective layer on an article that has been previously coated with a thermal barrier coating system, the result is as depicted in FIG. 5. The protective layer 38 is achieved, but the top coat 30 portion of the thermal barrier coating system 32 is completely disrupted and made useless as a protection against oxidation and corrosion damage to the article. The difference with this conventional approach and the present approach is found in two areas. First, the common practice of the conventional approach is to utilize a very small amount of aluminum in the aluminide coating source material, typically on the order of about 3 percent by weight, when the coating is applied to nickel-based alloys. The present approach utilizes about 20–40 percent by weight. Second, the conventional approach requires the inclusion of at least 0.1 percent by weight of the halide activator, while the present approach utilizes no halide activator. (Pack cementation mixtures for cobalt alloys may have as much as 40 weight percent of the source mixture, but use an activator.)

Although the present invention has been described in connection with specific examples and embodiments, it will be understood by those skilled in the arts involved, that the present invention is capable of modification without departing from its spirit and scope as represented by the appended claims.

What is claimed is:

1. A process for providing an intermetallic coating on the surface of an article, comprising the steps of:
providing an article having a bond coat overlying at least a portion of the surface of the article and a ceramic thermal barrier coating overlying the bond coat; and
applying a protective layer over an uncoated portion of the surface by contacting at least the uncoated portion of the surface of the article with an intermetallic coating source material, the intermetallic coating source material comprising a mixture of a metallic source of aluminum and ceramic particles, the intermetallic coating source material having no halide activator therein.

2. A process for providing an aluminide coating on the surface of an article, comprising:
providing an article having a bond coat overlying at least a portion of the surface of the article and a ceramic thermal barrier coating overlying the bond coat; and
contacting at least the uncoated portion of the surface of the article with an aluminide coating source material, the aluminide coating source material comprising a mixture of from about 20 to about 40 percent by weight of a metallic source of aluminum and the balance ceramic particles, the aluminide coating source material having no halide activator therein.

3. The process of claim 2, wherein the article is made of a nickel-based superalloy.

4. The process of claim 2, wherein the metallic source of aluminum is aluminum metal and a metal carbide alloy.

5. The process of claim 2, wherein the metallic source of aluminum is an aluminum-containing alloy.

6. The process of claim 2, wherein the metallic source of aluminum is about 30 percent by weight of the aluminide coating source material.

7. The process of claim 2, wherein the metallic source of aluminum is in the form of a powder.

8. The process of claim 2, wherein the metallic source of aluminum is in the form of an aluminum-containing liquid.

9. The process of claim 2, wherein the ceramic particles are aluminum oxide particles.

10. An article prepared by the process of claim 2.

11. A process for providing an aluminide coating on the surface of an article, comprising the steps of:
providing an article having a bond coat overlying at least a portion of the surface of the article and a ceramic thermal barrier coating overlying the bond coat;
subjecting the article to conditions such that, after the step of subjecting, an uncoated portion of the surface of the article has no bond coat and no ceramic thermal barrier coating thereupon; and
coating at least the uncoated portion of the surface of the article with an aluminum-containing coating by contacting the uncoated portion with an aluminum coating source material at elevated temperatures so that the uncoated portion of the surface is aluminided by diffusion, the aluminide coating source material having no halide activator therein, without damaging the ceramic thermal barrier coating on the remainder of the article.

12. The process of claim 11, wherein the step of coating is accomplished by contacting at least the uncoated portion of the surface of the article with the aluminide coating source material, said source material comprising a mixture of from about 20 to about 40 percent by weight of a metallic source of aluminum and the balance ceramic particles.

13. The process of claim 11, wherein the step of subjecting includes
damaging the article such that a portion of the bond coat and the ceramic thermal barrier is removed from the surface so that the step of coating constitutes a repair of the surface of the article.

14. The process of claim 11, wherein the step of subjecting includes
processing the article by machining of the surface that results in a portion of the surface of the article having no bond coat and no ceramic thermal barrier coating thereupon.

15. The process of claim 14, wherein the step of processing involves removing a portion of the surface of the article to create new, uncoated surface.

16. An article prepared by the process of claim 11.

17. The process of claim 1, further including the step of applying an insulative top coat over the protective layer.

18. The process of claim 17, wherein the top coat is a ceramic.

19. The process of claim 1 wherein the protective layer is an intermetallic aluminide compound selected from the group consisting of nickel aluminide, rhodium aluminide, platinum aluminide and combinations thereof.

* * * * *